(12) United States Patent
Baio et al.

(10) Patent No.: US 7,844,604 B2
(45) Date of Patent: *Nov. 30, 2010

(54) AUTOMATICALLY GENERATING USER-CUSTOMIZED NOTIFICATIONS OF CHANGES IN A SOCIAL NETWORK SYSTEM

(75) Inventors: Andrew Baio, Palo Alto, CA (US); Gordon Luk, Sunnyvale, CA (US); Leonard H. Lin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 11/647,941

(22) Filed: Dec. 28, 2006

(65) Prior Publication Data

US 2008/0162510 A1 Jul. 3, 2008

(51) Int. Cl.
*G06F 17/30* (2006.01)
(52) U.S. Cl. .................. 707/732; 707/706; 707/758; 707/784
(58) Field of Classification Search ............... 707/1–4, 707/6, 9–10, 100, 102, 104.1, 200, 648, 672, 707/682, 705–706, 753–754, 758, 783–785, 707/732, 736, 709; 709/215–226; 705/1; 715/738, 753; 455/412.1, 412.2, 411
See application file for complete search history.

(56) References Cited

U.S. PATENT DOCUMENTS 5,278,539 A * 1/1994 Lauterbach et al. ..... 340/539.18
6,845,389 B1 * 1/2005 Sen et al. .................. 709/204

(Continued)

FOREIGN PATENT DOCUMENTS

WO WO 2006/062532 * 6/2006
WO WO 2008/097969 * 8/2008

OTHER PUBLICATIONS

Uwe Matzat et al. "Academic communication and Internet Discussion Groups: transfer of information or creation of social contacts?",Social Networks 26 (2004) 221-255.*

*Primary Examiner*—Srirama Channavajjala
(74) *Attorney, Agent, or Firm*—Hickman Palermo Truong & Becker LLP; Deborah L. Caswell (57) ABSTRACT

Techniques are described herein for notifying a member of a social network system of those changes, within the social network system, that are of most interest to the member. In one embodiment, change records are generated for changes in the social network system. The change records are stored in an activities log. To notify a particular user of changes that would be of interest to the user, a subset of the change records contained in the activities log is selected based on user-specific selection criteria. Once the subset of change records has been selected, a set of notification records is generated based on the subset of change records. To reduce the possibility of information overload, the subset of change records is consolidated by removing duplicates and merging related notifications. The consolidated list of user-specific notifications may then be sent to the user. A variety of mechanisms may be used to send the notifications to the user, including streaming the notifications to a user (e.g. via an RSS feed), placing the notifications in a web page that is sent to the user, and sending the user an email that lists the notifications.

28 Claims, 4 Drawing Sheets

U.S. PATENT DOCUMENTS

| | | | |
|---|---|---|---|
| 7,143,091 B2 * | 11/2006 | Charnock et al. | 707/5 |
| 7,263,076 B1 * | 8/2007 | Leibovitz et al. | 370/310 |
| 7,373,606 B2 * | 5/2008 | Gorzela | 715/738 |
| 7,523,385 B2 * | 4/2009 | Nguyen et al. | 715/200 |
| 2002/0156787 A1 * | 10/2002 | Jameson et al. | 707/10 |
| 2003/0033296 A1 * | 2/2003 | Rothmuller et al. | 707/3 |
| 2003/0200192 A1 * | 10/2003 | Bell et al. | 707/1 |
| 2004/0205134 A1 * | 10/2004 | Digate et al. | 709/206 |
| 2005/0197894 A1 * | 9/2005 | Fairbanks et al. | 705/14 |
| 2006/0206381 A1 * | 9/2006 | Frayman | 705/14 |
| 2006/0224624 A1 * | 10/2006 | Korn et al. | 707/104.1 |
| 2006/0253418 A1 * | 11/2006 | Charnock et al. | 707/1 |
| 2007/0233708 A1 * | 10/2007 | Baio et al. | 707/100 |
| 2007/0233736 A1 * | 10/2007 | Xiong et al. | 707/104.1 |
| 2007/0239507 A1 * | 10/2007 | Madhogarhia | 705/8 |
| 2007/0239761 A1 * | 10/2007 | Baio et al. | 707/102 |
| 2007/0281690 A1 * | 12/2007 | Altman et al. | 455/435.1 |
| 2008/0065599 A1 * | 3/2008 | Baio et al. | 707/3 |
| 2008/0133593 A1 * | 6/2008 | Clark | 707/104.1 |

\* cited by examiner

AUTOMATICALLY GENERATING USER-CUSTOMIZED NOTIFICATIONS OF CHANGES IN A SOCIAL NETWORK SYSTEM

FIELD OF THE INVENTION

The present invention relates to social networks and, more specifically, to conveying to members of a social network recent changes in which they would be interested.

BACKGROUND

Various types of social network systems have been created using modern communication technology. One type of social network system allows users to post messages about events, such as parties, seminars, etc. Once a message about an event has been posted, users can indicate that they are interested in the event. An event in which a user has indicated an interest is referred to herein as an "event of interest" to the user.

A user may designate different types of interest that a user designates for different events of interest. For example, a user may set up a watch on one event of interest, and may indicate that he/she plans to attend another event of interest.

In addition to designating interests in events, members of a social network system may take various actions relative to events and other users. For example, users may add comments relating to events and modify the description of events. With respect to other users, a user may designate users as "friends", define a user group, moderate a user group, and join a user group.

Each member of a social network may be interested in many events, and may be a member of many user groups. The number of events, groups, and friends in which a user is interested may be such that it would be impractical for the user to have to repeatedly check all of the events, groups and friends to see whether any of them have been changes since the last time the user inspected them.

To avoid making users repeatedly check for changes, the social network system may automatically provide the user with notifications that take place in the system. However, as the social network system grows, so would the number of such notifications. If the number of notifications sent to a user becomes too great, the notifications become more of a bother than an aid.

DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of a web page that includes listings from a user-specific notification stream, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for notifying a member of a social network system of those changes, within the social network system, that are of most interest to the member. In one embodiment, change records are generated for changes in the social network system. The change records are stored in an activities log. To notify a particular user of changes that would be of interest to the user, a subset of the change records contained in the activities log is selected based on user-specific selection criteria. Once the subset of change records has been selected, a set of notification records is generated based on the subset of change records. To reduce the possibility of information overload, the subset of change records is consolidated by removing duplicates and merging related notifications. The consolidated list of user-specific notifications may then be sent to the user. A variety of mechanisms may be used to send the notifications to the user, including streaming the notifications to a user (e.g. via an RSS feed), placing the notifications in a web page that is sent to the user, and sending the user an email that lists the notifications.

System Overview

Figure 1:
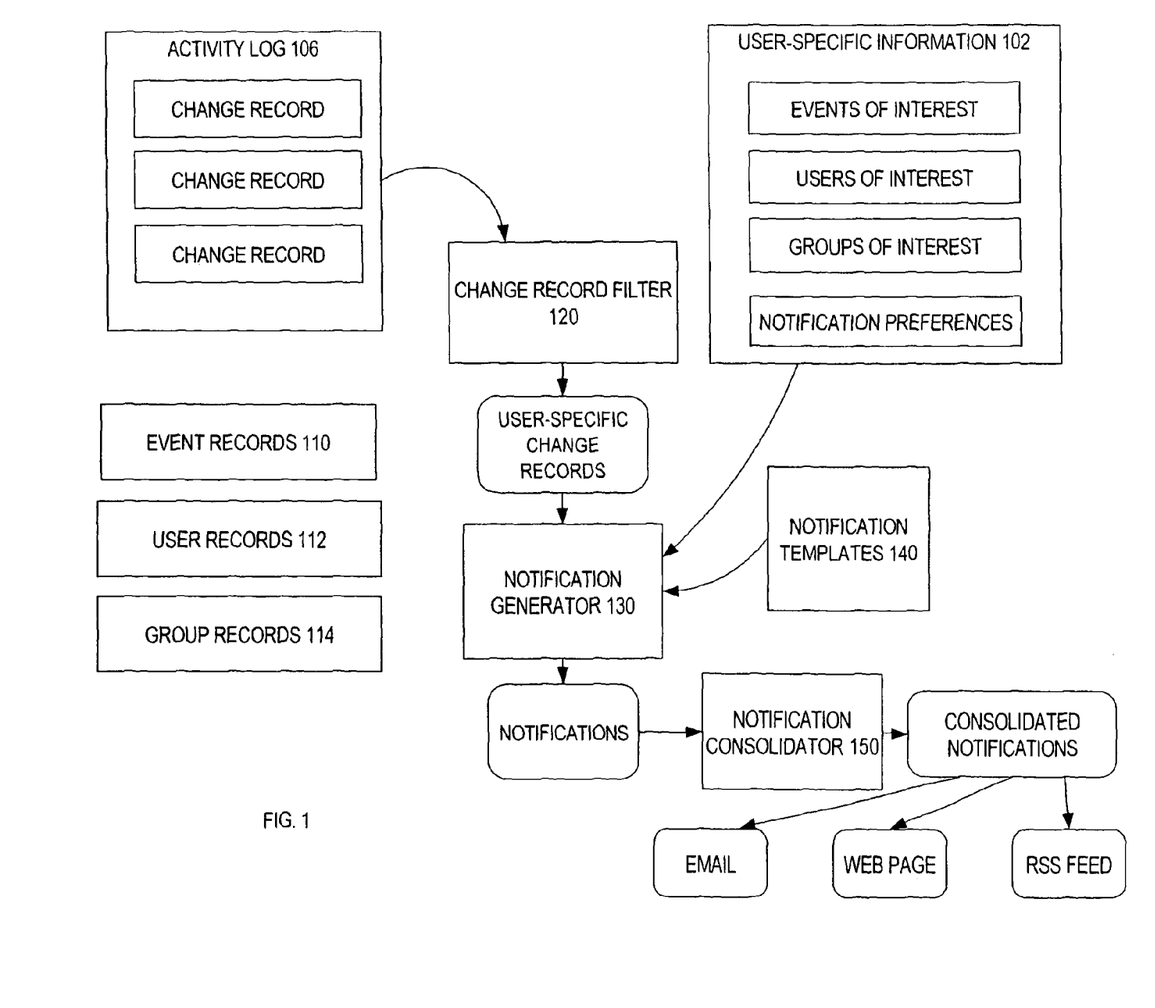
FIG. 1 is a block diagram of a system for generating client-specific notification streams to users of a social network system, according to an embodiment of the invention.

Referring to FIG. 1, it is a block diagram illustrating a system 100 for notifying members of a social network about changes in which they may be interested. System 100 is for a social network in which users post messages about events that other members may wish to attend. However, the techniques described herein may be employed in other types of social network systems. For example, the techniques described herein may be employed in social networks in which members post and share photos, videos, games, or social networks that are used for match-making. There is virtually no limit to the type of social network in which these techniques may be employed.

System 100 includes an activity log 106, and user-specific information 102. User-specific information 102 comprises metadata used to produce human-readable text out of the activity log change records. In one embodiment, user-specific information 102 is not fetched and combined with the change records until the notification generator 130 reads the notification templates 140. After the notification generator 130 has read the notification templates, notification generator 130 combines the template keywords with the polymorphic fields inside the change record to know which user-specific information 102 to fetch and replace the keywords with.

System 100 also includes a change record filter 120 that selects a user-specific set of change records based on the activity log 106. In one embodiment, the change record filter 120 may also take into account the user-specific information 102 when selecting the user-specific set of change records. The set of user-specific change records is received by a notification generator 130, which generates a user-specific notifications based on notification templates 140 and the user-specific information 102.

The user-specific notifications are consolidated by a notification consolidator 150, and provided to the user for whom the notifications were generated. The notifications may be provided in a variety of ways. For example, the notifications may be provided by email, as part of a web page, and/or as an information stream. In one embodiment, how the notification of an event is delivered is based on the type of the change. For example, changes that would be considered very important to a user (e.g. somebody designated the user as a "friend") may cause a notification to be sent by email, by RSS feed, and by a recent change listing included in a web page that is sent to the client. Certain changes may even trigger the transmission of an instant message notification, and/or a text message to a cell phone.

Each of the various components within the system of FIG. 1 shall be described hereafter in greater detail.

User-Specific Information

According to one embodiment, social network system 100 maintains user-specific information 102 for each user. The type of user-specific information 102 that is stored for each user will vary from implementation to implementation based on the nature of the social network. As mentioned above, the embodiment illustrated in FIG. 1 is for an event-centric social network. Consequently, in the illustrated embodiment, the user-specific information includes data that identifies "events of interest", "users of interest", "groups of interest", and "notification preferences".

Events of Interest

Events of interest are events in which the user has designated an interest. Depending on the social network system, there may be many types or levels of interest a user may have in events. In addition, a user may designate an interest in a variety of ways. For example, a user may directly indicate an interest by specifying that the user intends to attend a particular event. As another example, a user may directly indicate an interest by specifying that the user wants to "watch" the event. Users that are "watching" an event do not necessarily intend to attend the event, but are nonetheless interested in receiving notifications relating to the event. Events in which a user has explicitly expressed an interest are referred to herein as "directly-designated events of interest".

Users may also indirectly specify an interest in an event. For example, a user may specify an interest in all events that are associated with a certain geographic location. As another example, a user may specify an interest in all events that as associated with a certain tag, or that satisfy some other particular criteria. In these cases, events that satisfy the specified criteria may also be considered events that are of interest to the user, even though the user has not explicitly indicated in an interest in the particular events. Such events are referred to herein as "indirectly-designated events of interest".

Users of Interest

Users of interest are users in which a member of the social network has directly or indirectly specified an interest. For example, a member may directly specify an interest in another user by designating that user as a "friend". The friends of a member may themselves have designated friends. Those friends-of-friends may be treated as indirectly-designated users of interest to the user.

Indirectly-designated users of interest may also include members of groups to which a member belongs. For example, if a particular user belongs to a group A that includes other users X, Y and Z, then users X, Y and Z may be treated as indirectly-designated users of interest to the particular user.

The users that are "of interest" to a user may collectively be referred to as the user's "personal social network". Depending on the social network system, a user's personal social network may include only those members that the user has explicitly designated as "friends", or may also include members that are within a certain degree of separation from the user (e.g. friends of friends).

Groups of Interest

Groups of interest are those groups in which a member has specified an interest. For example, a user may have joined several user groups within the social network. Each of those user groups are treated as a group of interest for the user. To the extent that any of the user groups has subsidiary or related groups, those subsidiary or related groups may be treated as indirectly-designated groups of interest to the user.

Notification Preferences

Notification preferences generally indicate the types of changes about which a user wishes to be notified. As shall be described in greater detail hereafter, the user-specific notification preferences allow a user to override the default rules that govern which notifications should be sent to the user.

Activity Log

According to one embodiment, changes that occur within a social network are recorded in change records, and the change records are stored in activity log 106. The types of changes for which change records are generated will vary based on the type of social network system involved. For example, a social network system that is event-centric may store change records for:

Changes related to the events of interest (e.g. an event has been updated, someone in social network is now attending an event, a new comment has been added to an event of interest)

Changes in groups of interest (e.g. new events added to group, invites to a group, changes of rank in group, membership requests)

Changes to personal social network (e.g. users designating other users as friends, user removing friend designations)

The actual information stored in the change records will also vary from implementation to implementation. Further, the type of changes that trigger the generation of change records will also vary from implementation to implementation based, at least in part, on the nature of the social network system involved.

For the purposes of illustration, it shall be assumed that the social network system is an event-centric social network system in which users post events and indicate which events they plan to attend or watch.

In one embodiment, at the time a change occurs, the system determines which users should be notified of the change (the notification targets). Once the notification targets have been identified, the system stores a change record for each notification target. As shall be described in greater detail hereafter, the change records are used to by the system to generate a user-specific list of recent changes that are of interest to each user. While the change records for the notifications are generated in response to the occurrence of the change, the notifications themselves are generated dynamically at the time the notifications are to be sent.

In an alternative embodiment, the system may defer the identification of which users should be notified of a change. In such a system, a change may be represented by a single change record that is not associated with any specific notification target. At the time a user is to be provided a list of notifications, the system may determine which changes, within the activity log 106, are changes about which the user may be notified.

In an embodiment that identifies notification targets for changes in response to the occurrence of the changes, each change record may, for example, include the following fields:
  id
  user_id
  avatar_user_id
  activity_type
  target_type
  target_id
  activity_event_uid
  Timestamp
  origin_id
  message_text In this example, the "id" field stores data that identifies the change record. In one embodiment, every change record has an id that is unique relative to all other change records.

The "user_id" stores data that indicates the notification target for the change record.

The "avatar_user_id" field stores data that indicates field stores data that indicates the user that caused the change that is represented in the change record. The avatar_user_id may be used to look up information, about that user, to include in the notification about the change. For example, the avatar_user_id may be used to look up the username of the user and/or a digital image associated with the user. The username and/or image may then be incorporated in the notification that is generated for the change.

The "activity_type" field stores data that indicates the type of change that is represented by the change record. As shall be explained in greater detail hereafter, the activity type may be used as the basis for selecting the content and format of the notification for the change.

The "target_type" field stores data that indicates type of object on which the change was performed. For example, if the change is a new comment posted to an event, the target_type of the change is an event. On the other hand, if the change is that a user joined a group, the target_type of the change is a group.

The "target_id" field stores data that indicates the specific object on which the change was performed. For example, if the change is a new comment posted to an event, then target_id is the identifier of the object that represents that event to which the new comment was posted. The target_id may be used, for example, to look up information to include in the notification for the change. Thus, if the target of a change is an event, the target_id may be used to look up the title of the event. The title may then be included in the notification for the change. In addition, the target_id may be used to include, in the notification, a link to the target or to information relating to the target.

The "activity_event_uid" field stores data that uniquely identifies the change that is represented in the change record. The same change may be represented in multiple change records. Each of the change records for a given event will have the same activity_event_uid value, but will have different id values. The activity_event_uid in the change record may also be useful in situations in which multiple users all consider Event X an event-of-interest. If a comment is posted to Event X, an activity change log record is created for each user that considers Event X an event-of-interest. In order to make sure the system knows that this is tied to a single event (for reporting or administrative purposes), the system gives each of these change records the same activity_event_uid.

The "Timestamp" field stores data that indicates the time in which the change occurred. The timestamp may be used to order the notifications within the stream so that the user may easily identify the most recent changes.

The "origin_id" field stores data that indicates an addition dimension associated with the change. For example, assume that the change is that an event was posted to a group by a particular user. In this example, the group is the target of the change, and origin_id would include identify the event object of the event that was posted.

The "message text" field stores data that indicates the text of the notification that is to be sent for the change. As shall be described in greater detail hereafter, the text may be based on a template that is selected based on the type of change represented by the change record.

Any type of data container may be used to store the activity log 106. For example, activity log 106 may be implemented as a relational table within a relational database. Alternatively, activity log 106 may be implemented as a set of change record objects within an object-relational database.

Change Record Filter 120

For large social network systems, presenting each user with notifications of all of the changes in activity log 106 would inevitably result in information overload. Therefore, system 100 includes a change record filter 120 that determines, based on the user-specific information 102, which change records within the activity log 106 would be of interest to a given user. The change record filter 120 generates a set of user-specific change records by selecting only those records, within the activity log 106, which would be of interest to the user.

In selecting the change records for a particular user, the change record filter 120 takes into account the user-specific information 102 of the user. Since the user-specific information 102 varies from user to user, so will the change records that are selected by the change record filter 120. Thus, given the same contents of activity log 102, change record filter 120 may select completely different sets of change records for different users.

In an embodiment where notification targets are identified at the time changes occur, the change record filter 120 may simply select those change records, within activity log, where the user_id value matches the user_id of the user for whom the user-specific set of change records is being generated.

Selection Rules

In an embodiment where notification targets are identified at the time changes occur, the system determines the notification targets for the changes based on selection rules. In an embodiment in where the identification of notification targets is deferred, the change record filter 120 selects change records based on selection rules.

According to one embodiment, the selection rules used to determine the notification targets for a change included default selection rules, as revised and/or supplemented by the notification preferences of each user. Each selection rule is associated with its own selection criteria. For example, one default selection rule may select all changes to events that have been designated as events of interest to the user. Another default selection rule may select all changes that were made by members that have been designated as "friends" of the user.

Both of these examples, the selection rules use of a single filter condition to select change records that would be of interest to a user. However, a single filter condition is often insufficient to prevent information overload. For example, a user may have established watches on several popular events that thousands of users are attending. If a user is sent a notification of every time a user indicates attendance of those events, the user may be inundated with information that is not particularly interesting to the user. Therefore, according to one embodiment, the selection criteria associated with any given selection rule may include multiple filter conditions.

The following are examples of selection rules that include multiple filter conditions:

- changes made by users of interest to events of interest
- changes that represent friends attending/ceasing to attend events of interest
- changes that represent changes to the day/time of an event that the user is attending
- changes made by friends to events of interest associated with groups of interest
- changes that represent friends joining/leaving groups of interest These are merely examples of selection rules with multiple conditions. The number of variations of such rules is virtually unlimited. Significantly, for any given dimension, the filter conditions of a rule may be specified at various degrees of granularity. For example, relative to the "events" dimension, a filter condition may involve all events, all events of interest, all events that a user is attending, or all events that the user will be attending within the next two days. Relative to the users dimension, a filter condition may involve all users, all users of interest, all friends, or all friends that belong to a particular group.

In one embodiment, the default selection rules include selection rules that select the following types of change records that represent the following situations:

- A user's friend attends/watches an event the user is watching.
- Someone comments on an event the user is watching
- The use has been invited to an event.
- The user has been invited to a group.
- Someone RSVPs to an invite the user sent.
- A group the user moderates needs attention.
- An event the user is watching has updated info.
- Multiple people commented on an event the user is watching.
- Someone added the user as their friend.
- A new event was posted to the user's group.
- A new event is waiting for moderation at the user's group.
- A new user is waiting for moderation at the user's group.
- The user was kicked from a group.
- The user was banned from a group.
- The user was unbanned from a group.
- The user was promoted to a group moderator.
- The user was accepted to a group.
- The user was denied membership to a group.
- The user was given ownership of a group.

The ability to specify filter conditions at various levels of generality, to specify multiple filter conditions per selection rule, and to override or supplement the default selection rules with user-specific notification preferences, allows the user-specific change records to be carefully tailored to include those changes a particular user wants to see, while excluding the changes the particular user does not want to see.

User-Specific Notification Generator

As mentioned above, the user-specific set of change records that is produced by the change record filter 120 is carefully tailored for a particular user. However, the change records themselves are not necessarily in the best format, or contain the best information, for presentation to a user. Therefore, rather than simply provide users with the information contained in the change records, notification generator 130 generates user-specific notifications based on information from those selected change records. To be user-friendly, such notifications may exclude some information from the change records, and bring in additional information.

According to one embodiment, the notification generator 130 generates user-specific notifications based on notification templates 140. Notification templates 140 generally represent rules that indicate what content to include in notifications. The templates may specify any number of characteristics of the notification, such as content, format, style, coloring scheme, background graphics, fonts and font characteristics, etc.

In one embodiment, each type of change has a corresponding notification template. In such an embodiment, the form and content of a notification is dictated by the type of change the notification is about.

In one implementation, the templates have the form:

change_type=>'template text'

The "template text" is the actual text to include in the notification. According to one embodiment, the template text may include one of more external references. The external references within the template text instruct the notification generator 130 to retrieve information, and to replace the external reference with the retrieved information. The information that is referred to by an external reference may be information from the change record, or information that is retrieved from elsewhere based on information that is contained within the change record. The following are examples of templates, according to one embodiment of the invention:

- ACTIVITY_FRIEND_ATTENDS_WATCHED=>'% AVATAR % is attending % TARGET %',
- ACTIVITY_COMMENT_ON_WATCHED=>'% AVATAR % posted a new comment to % TARGET %',
- ACTIVITY_COMMENT_ON_WATCHED_CONDENSED=>'New comment posted to % TARGET %',
- ACTIVITY_INVITED_TO_EVENT=>'% AVATAR % invited you to % TARGET %',
- ACTIVITY_GROUP_BAN_USER=>'% AVATAR % banned you from % TARGET %.

In an embodiment that uses these templates, the notification generator 130 would retrieve the template "ACTIVITY_FRIEND_ATTENDS_WATCHED=>'% AVATAR % is attending % TARGET %'" in response to a change record that indicates that a friend is attending an event that is being watched by the user. In response to the % AVATAR % external reference, the notification generator 130 retrieves the information about the friend that is attending the watched event. The information about the friend may be obtained by performing a lookup based on the value of the avatar_user_id field of the change record.

In response to the % TARGET % external reference, the notification generator 130 retrieves information about the event itself. The information about the event may be obtained by performing a lookup based on the value of the target_id field of the change record.

The information obtained by use-specific notification generator 130 in response to the external reference may or may not be textual. For example, the information that the notification generator 130 retrieves about the friend that is attending the watch event may include the user_name of the friend, a digital image of the friend, a video of the friend, and even a sound recording associated with the friend. The external references are then removed from the template, and replaced by the textual/visual information that was retrieved.

Referring to FIG. 2, it is a block diagram of a web page that includes a listing 202 of notifications of changes that are relevant to a particular user. The format and content of each of the notifications is dictated by the template that was used to generate the notification. In the illustrated embodiment, the template used to generate a notification is selected based on the type of change that the notification is for. Thus, notifications for the same type of changes have the same format, while notifications for different types of changes have different formats.

Notification Consolidator

Notification consolidator 150 consolidates the user-specific notifications produced by the notification generator 130. Additionally, the notification consolidator 150 may optionally be used to generate the end result to send back to the user, both in dynamic and synchronous cases. The consolidation process may involve both removing duplicate notifications, and consolidating related notifications. For example, five notifications that indicate "Comment posted to event X" may be combined into a single notification that "5 comments have been added to event X". Alternatively, rather than combining the five comments, duplicate elimination may simple leave one notification "Comment posted to event X".

As another example, a notification that "Your friend Joe is now attending event Y" can be combined with a notification that "Your friend Joe is now attending event Z" to create a notification "Your friend Joe is now attending events Y and Z".

These are merely examples of how notifications may be consolidated by notification consolidator 150. There is virtually no limit to the ways notifications may be consolidated. Notifications that correspond to different types of changes may also be consolidated with each other. For example, "A comment has been added to group Y", "Your friend Joe has joined group Y" and "You have been elevated to moderator of group Y" may all be combined into "Group Y: comment posted, Joe has joined, you have been elevated to moderator".

In the embodiment illustrated in FIG. 1, notification consolidator 150 consolidates notifications after the notifications have been generated from templates 140. However, in alternative embodiments, consolidation may take place at any point in the notification generation process. For example, consolidation may be performed on the user-specific change records. If the user-specific change records are consolidated prior to notification generation, it may not be necessary to consolidate after notification generation.

Some activity types, such as users posting comments to events of interest, would normally require a user to 1) know that a comment was posted, and 2) go to the event page to read the comment, in order to fully consume the data generated from the new activity. According to one embodiment, the activity log is in human-readable format to prevent users from needing to know that the comment was posted and go to the event page. According to one embodiment, the system gives the user the ability to see that a new comment was posted, and also to read it, when it is appropriate.

Typically, it is not appropriate to put all comments posted to events on a user's homepage, because there just isn't enough space. Due to that design challenge, the homepage only presents the user with the fact that "A new comment was posted to Event X". In one embodiment, the system marks such notifications with a human-readable description of how long ago it was posted.

If there were 8 comments posted, and only 5 slots for new human-readable activity notifications on the homepage, then it would not be particularly useful to show 5 messages, all saying "A new comment was posted to Event X." This appears as "junk" to the user, and will also pollute the activity module to the point that it loses usefulness. This is the motivation behind the creation of the notification consolidator 150, and is also the reason why it is most useful in notification formats where space is strictly limited.

Therefore, in this example, the Consolidator would effectively consolidate any of those comments on the same event ID that would appear in the activity module on the homepage, and only display the most recent activity change record's timestamp in human-readable form. According to one embodiment, separate template text is specified for consolidated forms, to ensure that they read well and apply just the most recent change record.

In other formats, such as RSS (Really Simple Syndication), space is not as much of an issue, and an activity log change records can be congruent to a single <item> node in RSS. This lets the system display the full content of the User-Specific Information without worrying about space. Hence, in some embodiments, the Notification Consolidator 150 is not used in such contexts. In one embodiment, each specific format of page, RSS, or email, optionally decides whether it wants to fetch the consolidated data using the Notification Consolidator 150.

Notification Order

The consolidated user-specific notifications are presented to a user to inform the user about recent changes in which the user may be interested. Consequently, in one embodiment of the invention, the order in which the notifications are listed in the notification stream corresponds to the order in which the associated change records were generated. Specifically, in one embodiment, the notifications in the notification stream are ranked based on the creation time of the corresponding change records, where the more recent the change, the higher the ranking. The notifications are then presented based on the ranking, with the highest ranked notification presented first.

In the example listings 202 illustrated in FIG. 2, the first-listed notification is for a change that occurred 2 minutes prior to the generation of the listings 202. The lowest-ranked notification is for a change that occurred 2 days prior to the generation of the listings 202. A control is provided which, when selected, retrieves listings for even older changes. In the illustrated embodiment, the control is a link associated with the text "See all recent updates . . . ".

According to one embodiment, the listings include a visual indication of when the corresponding changes occurred. For example, in listings 202, each listing visually indicates how recent the corresponding change is by the text "2 minutes ago", "18 hours ago", "2 days ago", etc.

By presenting the notifications in the order in which the corresponding changes occurred, and providing a visual indication of the age of the changes, a user is easily able to determine which changes in the list have not previously been seen by the user. The user may give such notifications more attention than those notifications that the user has previously seen.

Dynamic Generation of User-Specific Notifications

In one embodiment, user-specific change notifications for a user are generated at the time that the change notifications are going to be delivered to a user. Thus, in the case where the change notifications are included in a web page, the change notifications are generated in response to the user requesting the web page. In the case where the change notifications are delivered as a feed, the change notifications are generated at the time the feed is transmitted.

Because the change notifications are generated at the time the change notifications are delivered, the change notification that is provided to a user based on a particular change record may reflect modifications that occurred after the change record was generated. For example, assume that a change record is generated and stored in activity log 106 at time T1. At time T2, a user requests a web page that is to include a list of change notifications.

In response to the request, the change record filter 120 generates a user-specific change records. That user-specific list may include the change record that was generated at time T1. That list is fed to notification generator 130 which generates a notification based on that change record. However, in generating the notification, the notification generator 130 uses the version of the template that exists at time T2, which may be different than the version that existed at time T1. In addition, the template may call for the inclusion of information that is stored separate from the change record. For example, the template may call for inclusion of the "avatar" of a friend that is identified in the change record. In generating the notification, the notification generator 130 uses the external information as it exists at time T2. Thus, the notification generator 130 may include in the notification information, about the friend, that did not exist at time T1.

In addition to template changes and external information changes, the dynamic notification generation process is also able to take into account any user preference modifications. Thus, even though a user's preferences at time T1 would have caused a user to be notified of a particular change, those preferences may have been changed prior to T2 in a way that excludes notification of that particular change. Consequently, as the notifications are generated at time T2, no notification is generated for the particular change even though the corresponding change record may have been stored prior to the change in the user preferences.

Expanded View

As mentioned above, during the process of generating a consolidated notification stream for a user, many details about the changes are excluded in order to avoid information overload. However, a user may want to get more details about one or more changes identified in the consolidation notification listing. According to one embodiment, a user interface control is provided that a user may select to obtain those details. For example, each change notification may be associated with a link which, when activated, causes retrieval of more information about the change(s) identified in the change notification.

In addition to, or instead of, such per-notification controls, the user may also be presented with a control which, when selected, provides an "expanded view" of all of the notifications in the consolidated notification listing. Such an expanded view is illustrated in FIG. 3.

Figure 3:
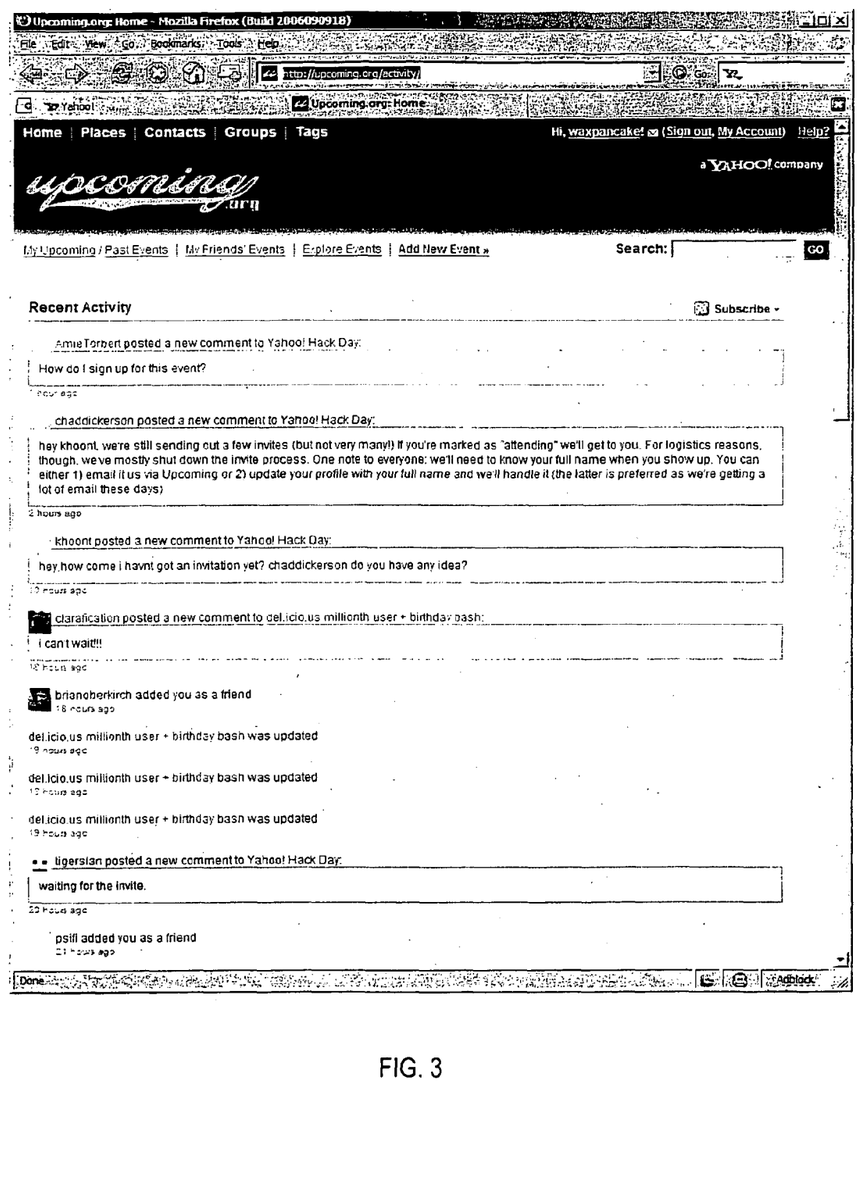
FIG. 3 is a block diagram of a web page that includes an expanded listing from a user-specific notification stream, according to an embodiment of the invention.
Figure 4:
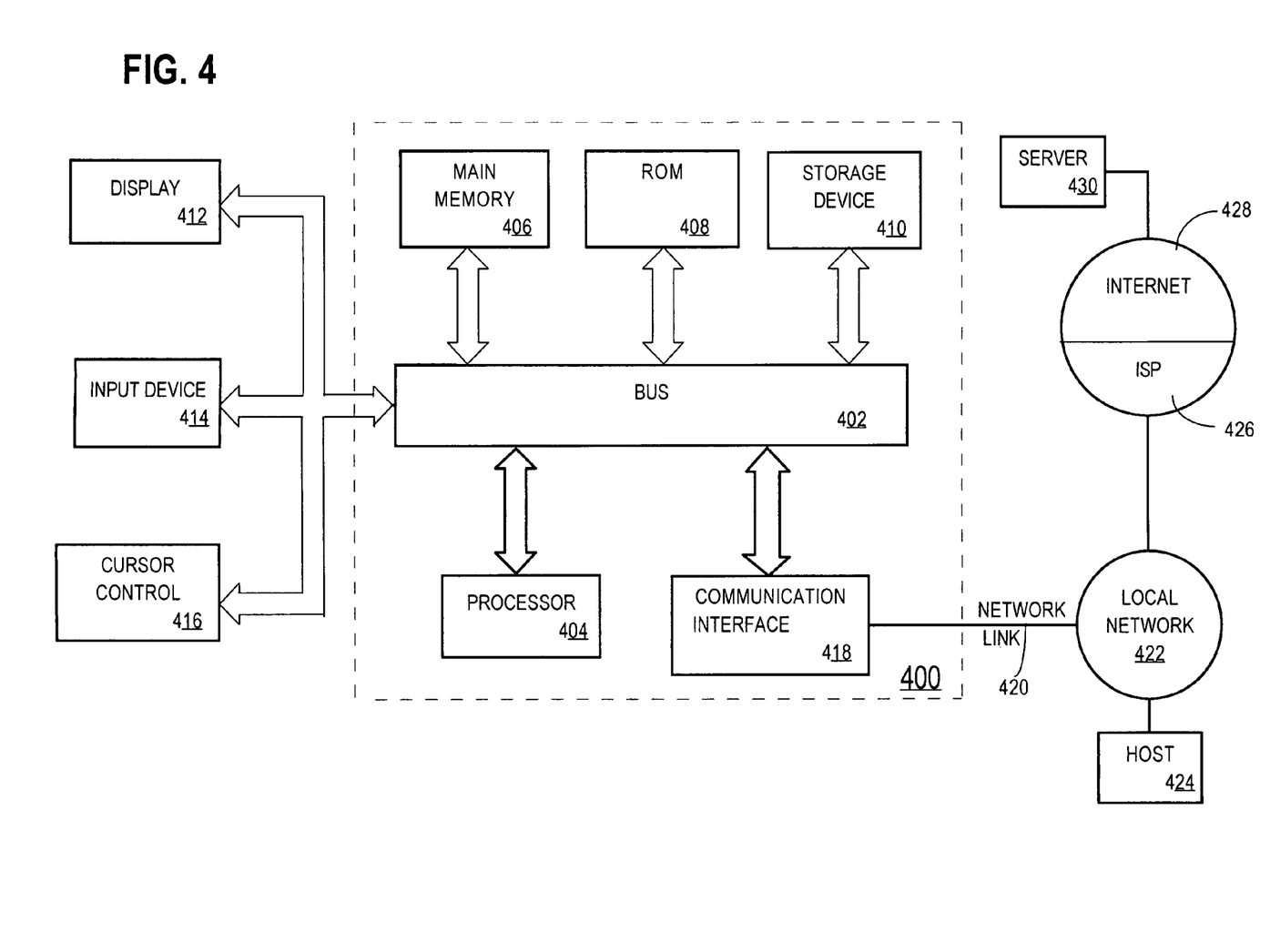
FIG. 4 is a block diagram of a computer system upon which embodiments of the invention may be implemented.

Referring to FIG. 3, it is a block diagram illustrating a web page in which the consolidated listing 202 of FIG. 2 have been expanded. In some cases, a single notification in the consolidated listing may expand into several listing in the expanded view. Further, the entries in the expanded view include information that is not presented in the consolidated view. For example, rather than simply indicate that a comment was added, the expanded view actually displays the text of the comment.

The additional information that is included in the expanded view may come from corresponding change record, or may be external information that the notification generator 130 locates based on information that is contained in the change record. For example, the change record for a new comment may not actually store an image of the user that submitted the comment. However, the image of the user that submitted a comment may be retrieved by the notification generator 130 based on information in the change record.

Heterogeneous Change Listing

According to one embodiment, the change listing presented to the user includes notifications about many different types of changes. Fore example, a single listing may include notifications about changes to a user's role in a group, comments posted to an event that the user is attending, and changes to the user's personal social network. By providing, in a single list, notifications of all of the types of changes in which a user is interested, the user need not spend time navigating a web site to acquire each of these distinct pieces of information.

Archival

Over time, the number of change records in the activities log will continue to grow. According to one embodiment, the timestamps associated with change records are used to determine which change records can be archived and/or deleted. For example, a change record may be archived when it reaches a certain age (e.g. one month), and deleted completely after it reaches another age (e.g. one year). In one embodiment, the archival rules take into account whether a notification has been sent for the change record. Thus, if a notification has already been sent to the change record, the change record may be archived after one week. However, if no notification has yet been sent, then the change record may be archived after several months.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing, for a user, first data that indicates events of interest to the user, wherein the events of interest that are indicated by the first data are events that are of interest to the user independent of who is involved in any changes related to the events;
   storing, for the user, second data that indicates people of interest to the user, wherein the people of interest that are indicated by the second data are people that are of interest to the user independent of events that are related to changes that the people make;

wherein the events of interest to the user are events for which changes can occur both relative to any one of a plurality of people of interest to the user and relative to people that are not of interest to the user;

wherein the people of interest to the user are people that may make changes both relative to events of interest to the user and relative to events that are not of interest to the user;

when a change related to an event occurs, storing a change record that records said change in an activities log that includes a plurality of change records;

while inspecting change records in the activity log, reading the change record that records the change related to the event;

in response to reading the change record that records the change, determining whether the change is of interest to the user by determining
  (a) whether the event is indicated in the first data and
  (b) whether the change relates to a person indicated in the second data;

in response to determining that the event is indicated in the first data and the change relates to a person indicated in the second data, including a notification about the change in a change listing that is provided to the user; and in response to determining that the event is indicated in the first data and the change relates to none of the people indicated in the second data, excluding the event from the change listing that is provided to the user;

sending the change listing to the user;

wherein the method is performed by one or more computing devices comprising one or more processors.

2. The method of claim 1 further wherein:
  the steps of
    determining whether the event is an event of interest to the user; and
    determining whether the change relates to a person that is of interest to the user,
  are performed in response to a request to provide said change listing to the user.

3. A machine-readable volatile or non-volatile storage medium storing one or more sequences of instructions which, when executed by one or more processors, causes the one or more processors to perform the method recited in claim 2.

4. The method of claim 1 wherein the step of determining which change records, of the plurality of change records, represent changes that would be of interest to the user is performed based, at least in part, on notification preferences that have been specified by the user.

5. A machine-readable volatile or non-volatile storage medium storing one or more sequences of instructions which, when executed by one or more processors, causes the one or more processors to perform the method recited in claim 1.

6. A machine-readable volatile or non-volatile storage medium storing one or more sequences of instructions which, when executed by one or more processors, causes the one or more processors to perform the method recited in claim 4.

7. The method of claim 1, wherein determining, based on the second data, whether the change relates to a person that is of interest to the user includes determining whether the person caused the change to occur.

8. A machine-readable volatile or non-volatile storage medium storing one or more sequences of instructions which, when executed by one or more processors, causes the one or more processors to perform the method recited in claim 7.

9. The method of claim 1, further comprising receiving a first notification about a first change to a particular event that relates to a first user; and
  receiving a second notification about a second change to the particular event that relates to a second user;
  wherein both the first user and the second user are people of interest to the user.

10. A machine-readable volatile or non-volatile storage medium storing one or more sequences of instructions which, when executed by one or more processors, causes the one or more processors to perform the method recited in claim 9.

11. A method comprising:
  storing a plurality of objects that represent a plurality of events;
  storing, for a user, data that indicates which, of said plurality of events, are events of interest to the user;
  when a change related to a particular event occurs, storing a change record about said change, wherein said change record includes a reference to the object that represents the particular event;
  wherein a title of the particular event is stored in the object that represents the particular event and not in said change record;
  determining, based on the data, that the change represented by the change record is a change that would be of interest to the user;
  retrieving from the change record the reference to the object that represents the particular event;
  using the reference to the object to retrieve from the object the title of the particular event; and
  including, within a notification for said change that is related to the particular event, the title that was retrieved from the object using the reference;
  wherein the method is performed by one or more computing devices comprising one or more processors.

12. A machine-readable volatile or non-volatile storage medium storing one or more sequences of instructions which, when executed by one or more processors, causes the one or more processors to perform the method recited in claim 11.

13. A method comprising:
  storing, for a user, first data that indicates events of interest to the user;
  when changes related to events occur, storing change records that record said changes in an activities log;
  selecting a subset of change records from said activities log based, at least in part, on the first data;
  wherein the subset of change records includes change records for changes related to events;
  generating a consolidated list of notifications to present to said user, wherein at least one notification in said consolidated list of notifications represents a plurality of change records in said subset of change records; and
  providing said consolidated list of notifications to said user;
  wherein the method is performed by one or more computing devices comprising one or more processors.

14. The method of claim 13 wherein the step of generating said consolidated list of notifications includes ordering listings within the consolidated list based on when the changes occurred.

15. A machine-readable volatile or non-volatile storage medium storing one or more sequences of instructions which, when executed by one or more processors, causes the one or more processors to perform the method recited in claim 14.

16. The method of claim 13 wherein:
the method further includes
- detecting changes that are not related to events; and
- storing change records about the changes that are not related to events in the activities log; and the subset of change records includes change records for changes related to events, and change records for changes that are not related to events.

17. The method of claim 16 wherein the changes that are not related to events include changes to private social networks.

18. A machine-readable volatile or non-volatile storage medium storing one or more sequences of instructions which, when executed by one or more processors, causes the one or more processors to perform the method recited in claim 17.

19. The method of claim 16 wherein the changes that are not related to events include changes relating to groups that have been established by users within the social network system.

20. A machine-readable volatile or non-volatile storage medium storing one or more sequences of instructions which, when executed by one or more processors, causes the one or more processors to perform the method recited in claim 19.

21. A machine-readable volatile or non-volatile storage medium storing one or more sequences of instructions which, when executed by one or more processors, causes the one or more processors to perform the method recited in claim 16.

22. The method of claim 13 further comprising providing a user interface control which, when selected, causes an expanded view of the changes in the subset of change records to be provided to the user.

23. The method of claim 22 wherein the consolidated list includes at least one notification that is represented by a plurality of notifications in the expanded view.

24. A machine-readable volatile or non-volatile storage medium storing one or more sequences of instructions which, when executed by one or more processors, causes the one or more processors to perform the method recited in claim 23.

25. The method of claim 22 wherein:
the consolidated list includes a notification relating to a comment on an event, but does not include text of the comment; and
the expanded view includes a notification relating to said comment, and includes text of the comment.

26. A machine-readable volatile or non-volatile storage medium storing one or more sequences of instructions which, when executed by one or more processors, causes the one or more processors to perform the method recited in claim 25.

27. A machine-readable volatile or non-volatile storage medium storing one or more sequences of instructions which, when executed by one or more processors, causes the one or more processors to perform the method recited in claim 22.

28. A machine-readable volatile or non-volatile storage medium storing one or more sequences of instructions which, when executed by one or more processors, causes the one or more processors to perform the method recited in claim 13.

* * * * *